United States Patent [19]
Parkes

[11] 4,047,733
[45] Sept. 13, 1977

[54] FIFTH WHEEL CARRIER HOIST

[75] Inventor: Alvin G. Parkes, Wingate, Pa.

[73] Assignee: The Raymond Lee Organization, Inc., New York, N.Y. ; a part interest

[21] Appl. No.: 657,365

[22] Filed: Feb. 12, 1976

[51] Int. Cl.² .......................... B60P 3/06; B62D 53/04
[52] U.S. Cl. ................................ 280/402; 214/86 A; 280/423 B
[58] Field of Search ............... 280/402, 415 R, 415 A, 280/415 B, 423 B, 423 R, 418; 214/86 A

[56] References Cited

U.S. PATENT DOCUMENTS

| 2,481,223 | 9/1949 | Johnson | 214/86 A |
| 2,663,574 | 12/1953 | Martin | 280/423 B |
| 3,384,390 | 5/1968 | Moiriat et al. | 280/423 B |
| 3,645,559 | 2/1972 | Stafford | 280/415 B |
| 3,881,749 | 5/1975 | Berends | 280/415 B |

Primary Examiner—Robert R. Song
Assistant Examiner—John A. Pekar
Attorney, Agent, or Firm—Daniel Jay Tick

[57] ABSTRACT

A hoist frame comprises a planar member having front and rear opposite ends and top and bottom planar surfaces and a pair of extending members comprising a pair of spaced parallel members extending from the bottom surface at the rear end of the planar member perpendicular to the bottom surface. Mounting means pivotally mounts the planar member of the hoist frame to the chassis frame at the bottom surface at the front end of the planar member in a manner whereby the extending members extend beyond and to an area beneath the chassis frame. A jack is affixed to the planar member of the hoist frame at the bottom surface at the rear end thereof equidistantly from the extending members and extending perpendicularly from the bottom surface for pivotally moving the hoist frame about the mounting means thereof. A pair of boom securing means extend perpendicularly from the top surface of the planar member in the areas of the front and rear end of the planar member for selectively releasably securing a variable length boom at one of the boom securing means or both of the boom securing means.

1 Claim, 7 Drawing Figures

FIFTH WHEEL CARRIER HOIST

DESCRIPTION OF THE INVENTION

The present invention relates to a fifth wheel carrier hoist. More particularly, the invention relates to a fifth wheel carrier hoist for a towing vehicle for towing heavy vehicles.

Objects of the invention are to provide a fifth wheel carrier hoist of simple structure, which is of very few parts and simple structure, but which has considerable structural strength, and functions efficiently, effectively and reliably to hoist or tow a very heavy vehicle with an advantageous distribution of the weight of the towed vehicle.

In order that the invention may be readily carried into effect, it will now be described with reference to the accompanying drawings, wherein.

The fifth wheel carrier hoist of the invention is for a towing vehicle 1 (FIGS. 1 to 3 and 5 to 7) for towing heavy vehicles such as, for example, a heavy tractor or similar vehicle 2 (FIGS. 2, 3, 6 and 7). The towing vehicle 1 has a chassis frame 3 (FIGS. 1 to 3 and 5 to 7).

Figure 2:
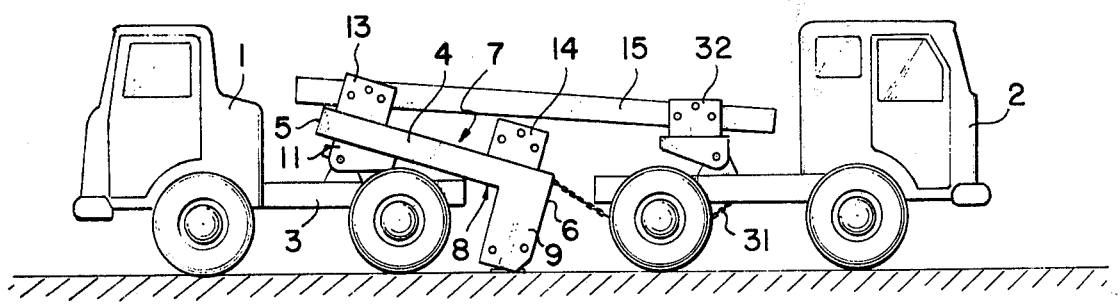
FIG. 2 is a view of the embodiment of FIG. 1 in application for affixing to a heavy vehicle to be towed.
Figure 4:
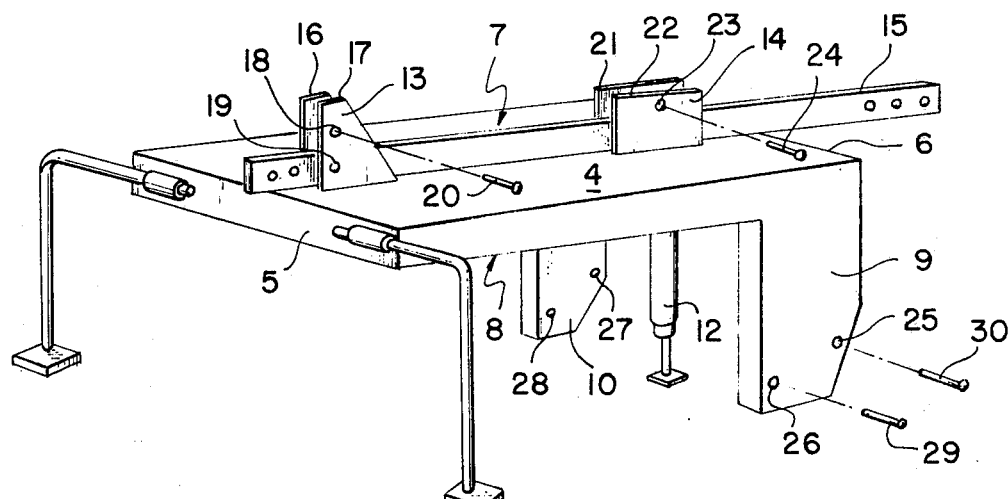
FIG. 4 is a perspective view of an embodiment of the fifth wheel carrier hoist of the invention.

The fifth wheel carrier hoist of the invention comprises a substantially planar member 4 having front and rear opposite ends 5 and 6, respectively, and top and bottom substantially planar surfaces 7 and 8 (FIGS. 2, 4 ad 7). The planar member 4 has a pair of extending members comprising a pair of spaced substantially parallel members 9 and 10 (FIG. 4) extending from the bottom surface 8 at the rear end 6 of the planar member 4 substantially perpendicular to said bottom surface.

A mounting device 11 pivotally mounts the planar member 4 of the hoist frame to the chassis frame 3 at the bottom surface 8 at the front end 5 of said planar member in a manner whereby the extending members 9 and 10 extend beyond, and to an area beneath, said chassis frame.

A jack 12 (FIGS. 1, 3, 4 and 7) is affixed to the planar member 4 of the hoist frame at the bottom surface 8 at the rear end 6 thereof substantially equidistantly from the extending members 9 and 10. The jack 12, which may comprise any suitable, heavy duty jack, extends substantially perpendicularly from the bottom surface 8 for pivotally moving the hoist frame about the mounting device 11 thereof.

A pair of boom securing devices 13 and 14 extend substantially perpendicular from the top surface 7 of the planar member 4 in the areas of the front and rear ends 5 and 6, respectively, of said planar member. The boom securing devices 13 and 14 selectively releasably secure a variable length boom 15 at the boom securing devices 13 and 14.

Each of the pair of boom securing devices 13 and 14 comprises a pair of spaced substantially parallel plates straddling the boom 15 and having holes formed therethrough, and pins adapted to be removably inserted via holes of the pair of spaced plates thereby restraining the boom between said plates. Thus, as shown in FIG. 4, for example, the boom securing device 13 comprises a pair of substantially parallel plates 16 and 17 straddling the boom 15 and having holes 18 and 19 formed through the plate 17. The corresponding holes, formed through the plate 16, are not seen in the FIGS. A pin 20 is adapted to be removably inserted in the hole 18 of the plate 17 and in the corresponding hole of the plate 16 thereby restraining the boom 15 between the plates 16 and 17. The boom securing device 14 comprises a pair of spaced substantially parallel plates 21 and 22 straddling the boom 15 and having a hole 23 formed through the plate 22 and a corresponding hole (not shown in the FIGS.) formed through the plate 21. A pin 24 is adapted to be removably inserted in the hole 23 of the plate 22 and the corresponding hole 21 thereby straddling the boom 15 between said plates.

Figure 6:
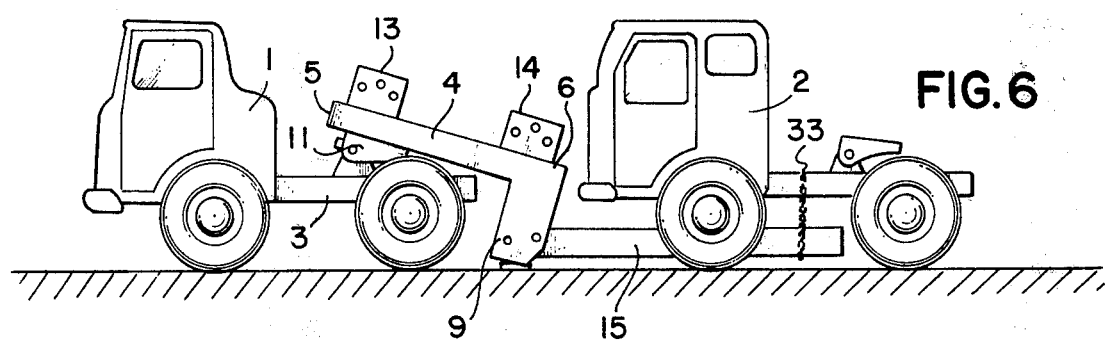
FIG. 6 is a view of the embodiment of FIG. 1 in the arrangement of FIG. 5, in application for affixing to a heavy vehicle to be towed.
Figure 7:
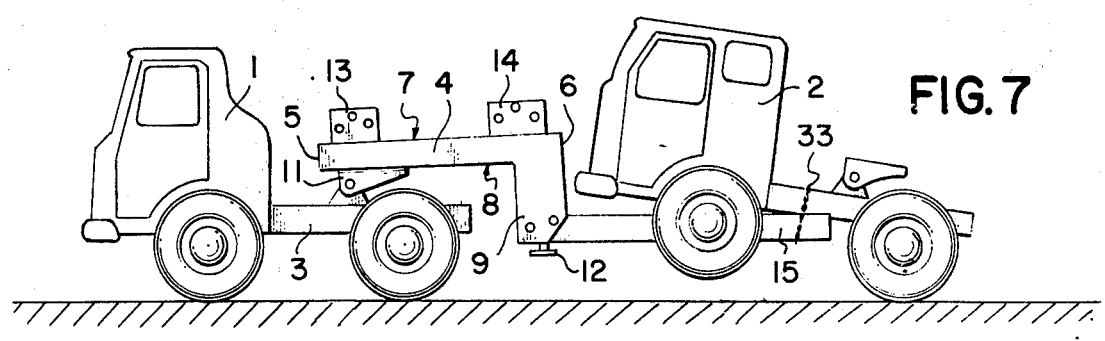
FIG. 7 is a view of the embodiment of FIG. 1, in the arrangement of FIG. 5, in application in use towing a heavy vehicle.

Each of the extending members 9 and 10 has holes 25 and 26, and 27 and 28, respectively (FIG. 4), formed therethrough for accommodating pins such as, for example, a pin 29, adapted to be removably inserted in selected one of such holes thereby supporting the boom 15 via the extending members, as shown in FIGS. 6 and 7. In such case, the pin 29 is removably inserted in the holes 26 and 28 and a pin 30, is removably insered in the holes 25 and 27.

Figure 3:
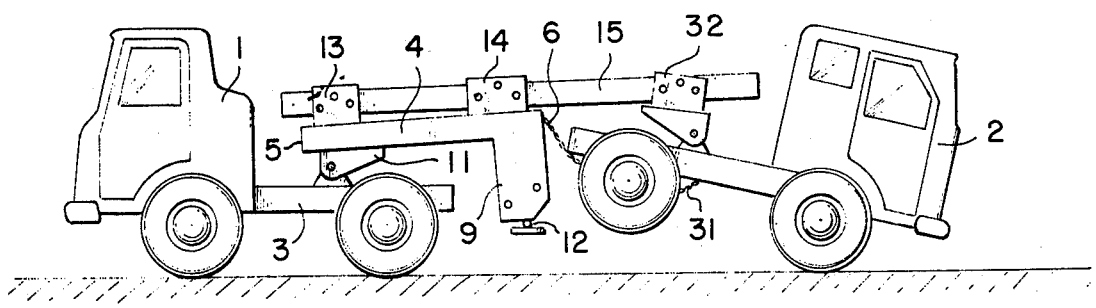
FIG. 3 is a view of the embodiment of FIG. 1 in application in use towing a heavy vehicle.

When the vehicle 1 is to tow the vehicle 2 in a backward manner, the vehicle 1 is backed up to the vehicle 2 and the hoist frame is pivotally moved until the jack and the extending members rest on the supporting surface of the vehicles. The boom 15 is extended and lowered with one end on the vehicle 2, so that it is then coupled at one end to the vehicle 1 and at the other end to the vehicle 2, as shown in FIGS. 2 and 3. A chain or cable 31 is then extended between the boom securing device 14 of the vehicle 1 and the boom securing device 32 of the vehicle 2, as shown in FIGS. 2 and 3. The chain or cable 31 is extended under the rear axle of the vehicle 2. The jack 12 is then operated to raise the hoist frame to the desired height and pins are positioned in the boom securing device to secure the boom 15 in position. After the pins are positioned, the jack 12 is withdrawn into its casing and the vehicles remain in the positions shown in FIG. 3.

If the vehicle 1 is to tow the vehicle 2 in a forward manner, the boom 15 is first supported at the lower parts of the extending members 9 and 10, by appropriate pins, as shown in FIGS. 6 and 7. The vehicle 1 is then backed up until a pair of twin booms 15 are positioned under the chassis of the vehicle 2. A chain 33 is then fastened around the twin booms 15 and the chassis of the vehicle 2, as shown in FIGS. 6 and 7. The jack 12 is then operated, so that it raises the boom 15 to a desired height above the supporting surface of the vehicles. When the desired height is reached, the jack is withdrawn into its housing, after additional pins are provided in the holes of the extending members to secure the twin booms thereon.

Figure 5:
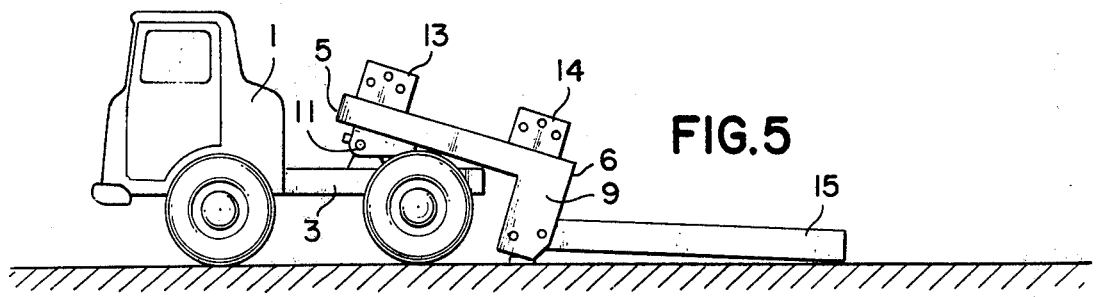
FIG. 5 is a view of the embodiment of FIG. 1 rearranged for towing a heavy vehicle in a different manner from that of FIGS. 2 and 3.

Although a single boom 15 is discussed throughout the disclosure, a pair of identical twin booms 15 are readily useable in its stead, as described with reference to FIGS. 5, 6 and 7.

Figure 1:
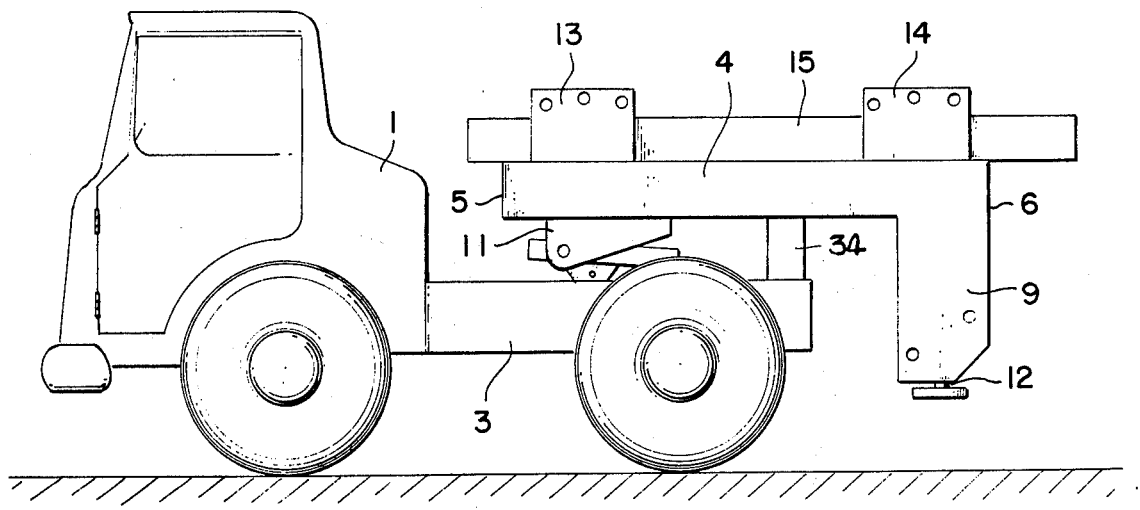
FIG. 1 is a view of an embodiment of the fifth wheel carrier hoist of the invention in non-use condition.

A block 34 is carried on the chassis frame 3 of the vehicle 2 under the boom 15 to support said boom while travelling without a load, as shown in FIG. 1.

While the invention has been described by means of a specific example and in a specific embodiment, I do not wish to be limited thereto, for obvious modifications will occur to those skilled in the art without departing from the spirit and scope of the invention.

I claim:

1. A fifth wheel carrier hoist for a towing vehicle for towing heavy vehicles, said towing vehicle having a chassis frame, said carrier hoist comprising a hoist frame comprising a substantially planar member having front and rear opposite ends and top and bottom substantially planar surfaces and a pair of extending members comprising a pair of spaced substantially parallel members extending from the bottom surface at the rear end of the planar member substantially perpendicular to said bottom surface, each of the pair of extending members having holes formed therethrough for accommodating pin means adapted to be removably inserted via selected holes thereof supporting a boom via each of said extending members;

mounting means pivotally mounting the planar member of the hoist frame to the chassis frame at the bottom surface at the front end of said planar member is a manner whereby the extending members extend beyond and to an area beneath said chassis frame;

jack means affixed to the planar member of the hoist frame at the bottom surface at the rear end thereof substantially equidistantly from the extending members and extending perpendicularly from said bottom surface for pivotally moving the hoist frame about the mounting means thereof;

a variable length boom; and a pair of boom securing means extending substantially perpendicularly from the top surface of the planar member in the areas of the front and rear ends of said planar member for selectively releasably securing the boom at one of the boom securing means or both of said boom securing means, each of the pair of boom securing means comprising a pair of spaced substantially parallel plates straddling the boom and having holes formed therethrough, and pin means adapted to be removably inserted via selected holes of the pair of spaced plates thereby restraining said boom between said plates.

* * * * *